United States Patent
Lesley

(10) Patent No.: US 8,556,555 B2
(45) Date of Patent: Oct. 15, 2013

(54) SECURITY STRAP

(75) Inventor: Kevin E. Lesley, Beaverton, OR (US)

(73) Assignee: Yakima Innovation Development Corporation, Georgetown, Grand Cayman (KY)

( * ) Notice: Subject to any disclaimer, the term of this patent is extended or adjusted under 35 U.S.C. 154(b) by 0 days.

(21) Appl. No.: 13/424,161

(22) Filed: Mar. 19, 2012

(65) Prior Publication Data

US 2012/0321409 A1 Dec. 20, 2012

Related U.S. Application Data

(60) Provisional application No. 61/454,397, filed on Mar. 18, 2011.

(51) Int. Cl.
*B60P 7/08* (2006.01)

(52) U.S. Cl.
USPC .......................................... 410/100

(58) Field of Classification Search
USPC ....... 410/34, 35, 96, 97, 100; 24/68 CD, 302, 24/265 CD; 224/315, 324, 563, 568; 248/499
See application file for complete search history.

(56) References Cited

U.S. PATENT DOCUMENTS

| | | |
|---|---|---|
| 913,469 A | 2/1909 | Cleaveland |
| 2,513,169 A | 6/1950 | Griswold |
| 2,916,786 A | 12/1959 | Legat |
| 3,703,024 A | 11/1972 | Johnson |
| 3,875,771 A | 4/1975 | Reisner |
| 3,879,810 A | 4/1975 | Prete, Jr. et al. |
| 3,987,653 A | 10/1976 | Lyon et al. |
| 4,366,605 A | 1/1983 | McKenney |
| 4,547,980 A | 10/1985 | Olivieri |
| 4,685,315 A | 8/1987 | Comolli |
| 5,423,644 A * | 6/1995 | First, Sr. ........................ 410/100 |
| 6,164,507 A | 12/2000 | Dean et al. |
| 6,199,412 B1 | 3/2001 | Kennedy |
| 6,385,822 B1 | 5/2002 | Dean et al. |
| 6,431,423 B1 | 8/2002 | Allen et al. |
| 6,470,718 B1 | 10/2002 | Yang |
| 6,510,717 B1 | 1/2003 | Levi |
| 6,543,096 B2 | 4/2003 | Settelmayer et al. |
| 6,561,398 B1 | 5/2003 | Cole et al. |
| 6,684,667 B2 | 2/2004 | Young |
| 6,715,449 B1 | 4/2004 | Jordan |
| 6,772,929 B1 | 8/2004 | Stein |
| 7,032,415 B2 | 4/2006 | Young |
| 7,121,122 B2 | 10/2006 | Levi |
| 7,322,780 B2 | 1/2008 | Hill |
| 7,424,813 B2 | 9/2008 | Wu |
| 7,454,932 B2 | 11/2008 | Hollier |
| 8,234,757 B2 | 8/2012 | Lesley |
| 2007/0068200 A1 | 3/2007 | Roloff et al. |
| 2007/0251279 A1 | 11/2007 | Hollier |
| 2010/0043186 A1 | 2/2010 | Lesley |

* cited by examiner

*Primary Examiner* — Stephen Gordon
(74) *Attorney, Agent, or Firm* — Kolisch Hartwell, P.C.

(57) ABSTRACT

A theft resistant strap and buckle assembly for securing cargo on a vehicle rack includes a strap and a buckle. The strap is reinforced to resist cutting. The buckle has a lock and cam device that operates to prevent loosening of the strap when the buckle is locked.

12 Claims, 5 Drawing Sheets

SECURITY STRAP

CROSS-REFERENCE TO RELATED APPLICATION

This application claims priority under 35 U.S.C. §119 and applicable foreign and international law of U.S. Provisional Patent Application Ser. No. 61/454,397 filed Mar. 18, 2011 which is also incorporated herein by reference. This application also incorporates by reference in its entirety U.S. patent application Ser. No. 12/493,106 filed Jun. 26, 2009.

FIELD

The present disclosure relates to straps for securing cargo on a vehicle, particularly straps with a locking mechanism.

BACKGROUND

People frequently carry cargo on vehicles. Specialized racks are available for securing recreational items typically on top or on the rear of vehicles. Carrying cargo outside the vehicle is a convenient way to increase carrying capacity, particularly considering current trends to drive smaller, more fuel efficient vehicles, and particularly with respect to inherently large items that usually don't fit well inside a vehicle, for example, boats, bikes, skis, and surfboards. However, a significant concern with external carrying devices is the potential for theft.

Some cargo items require straps to bind things to a rack or to an external surface of a vehicle. For example, straps are typically used to secure boats and surfboards on top of vehicles. Straps are also commonly used to secure baggage to external racks. Unfortunately, straps may be easily cut or loosened sufficiently for a thief to quickly remove cargo from the vehicle. There is a need for strapping devices that are more secure from theft, easy to use, and which address other related manufacturing and/or performance problems.

SUMMARY

A theft resistant strap and buckle assembly for securing cargo on a vehicle rack includes a strap and a buckle. The strap is reinforced to resist cutting. The buckle has a lock and cam device that operates to prevent loosening of the strap when the buckle is locked.

DETAILED DESCRIPTION

Figure 1:
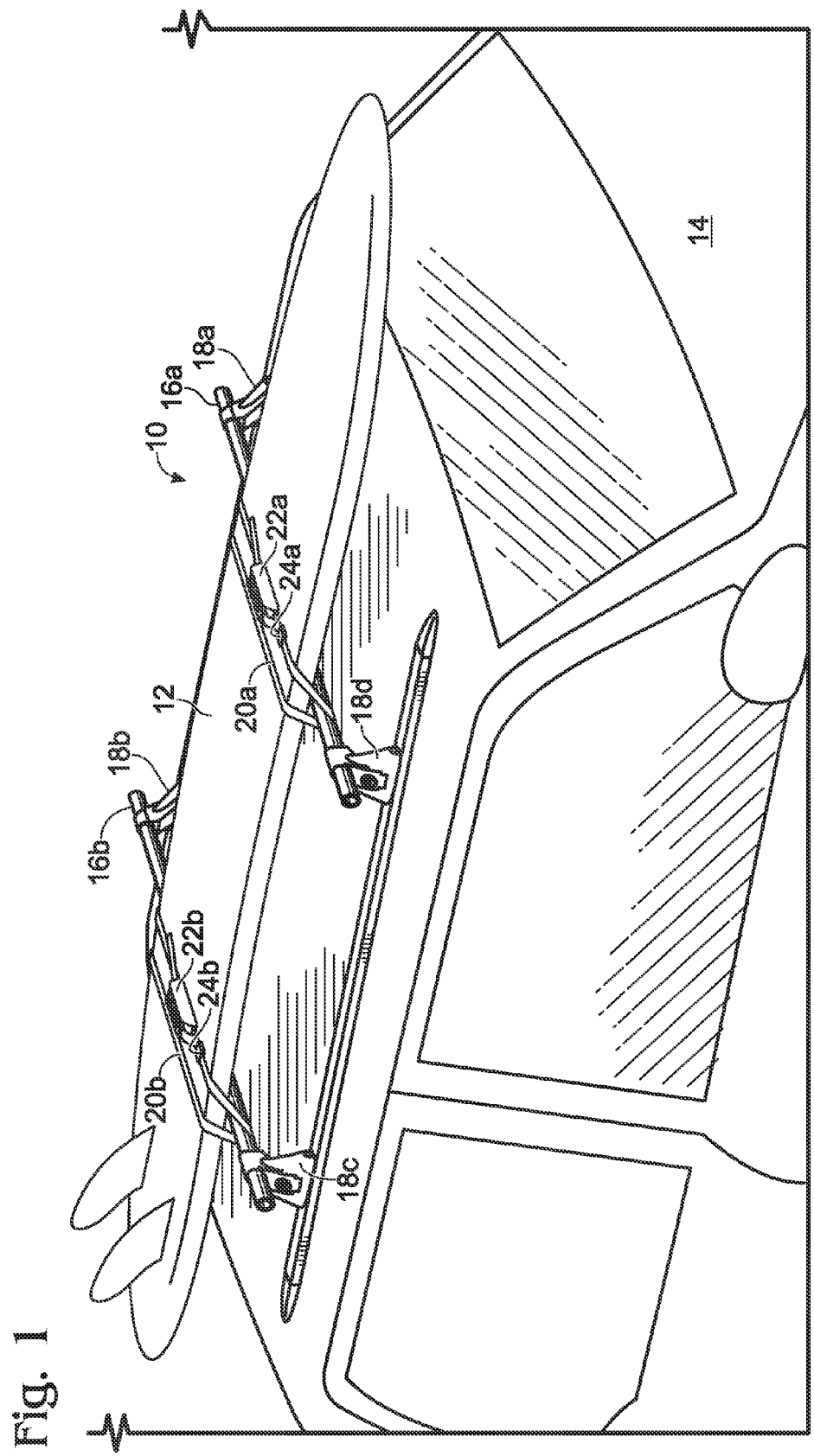
FIG. 1 is a perspective view of a rack for securing cargo onto crossbars on top of a vehicle using a buckle and a strap.
Figure 2:
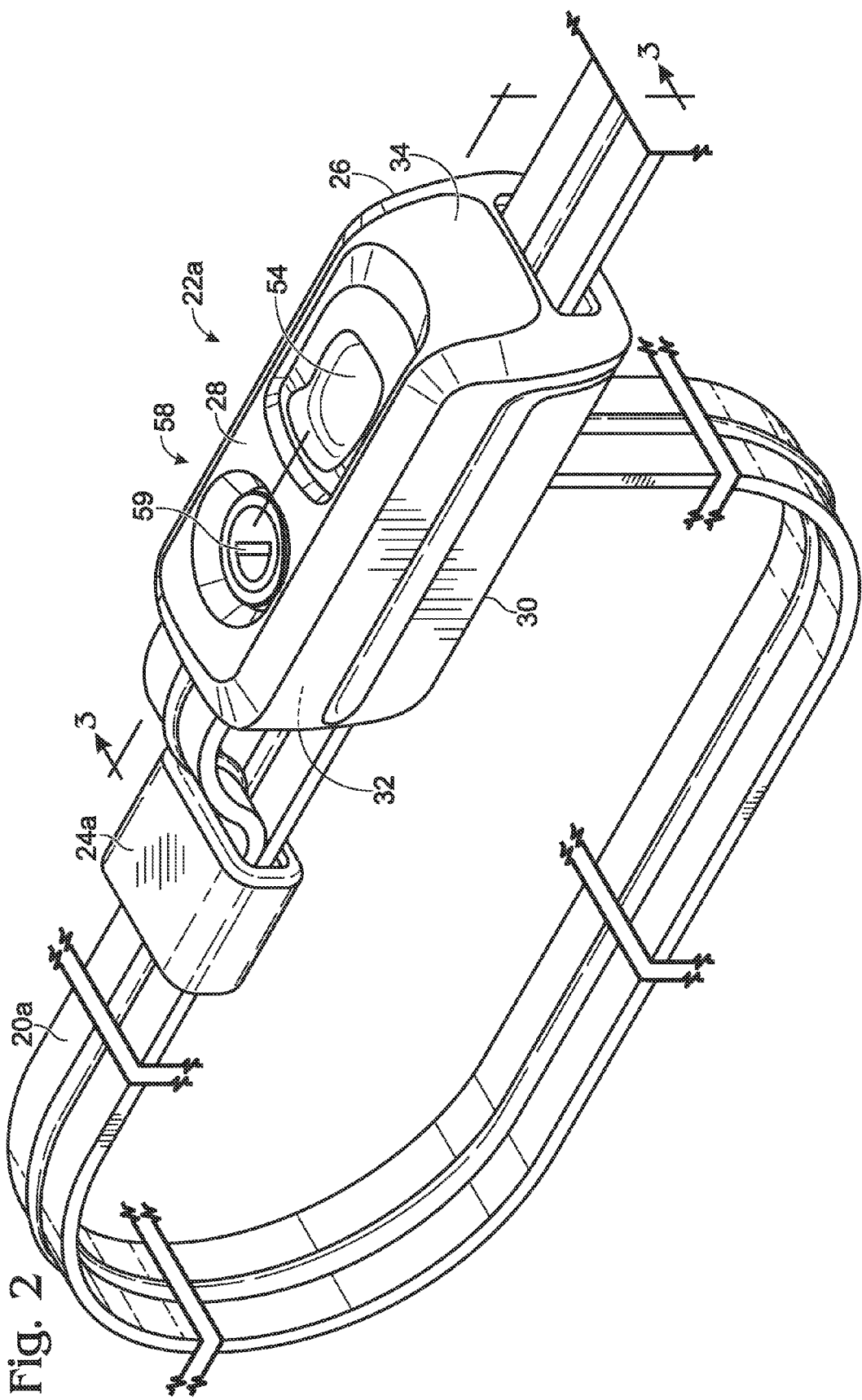
FIG. 2 is a perspective view of a buckle and a strap for securing cargo.

FIGS. 1 and 2 show a rack 10 for carrying cargo (e.g., a surf board 12 is shown, but the cargo can be anything, including bicycles, luggage, etc.) on a vehicle 14. Rack 10 may include a pair of crossbars 16a, 16b, secured to a vehicle 14 via towers 18a-d. One or more straps (or belts) 20a, 20b may be used to bind cargo (e.g., surfboard 12) onto vehicle 14, for example by binding the cargo to crossbars 16a, 16b. As shown, straps 20a and 20b are basically the same. A first end or portion of strap 20a may be fixed with a crimp 24a (24b for strap 20b). A second end or portion of strap 20a may be adjustable to secure cargo 12. Buckles 22a, 22b may be used to tension, tighten and secure straps 20a, 20b, respectively.

As shown in FIG. 2, buckle 22a may include a housing 26. Housing 26 may have a top wall 28, a bottom wall 30, a first end 32, and a second end 34. One or more of the walls or ends may have one or more openings allowing for portions of strap 20a to pass through the walls and/or ends.

Figure 3:
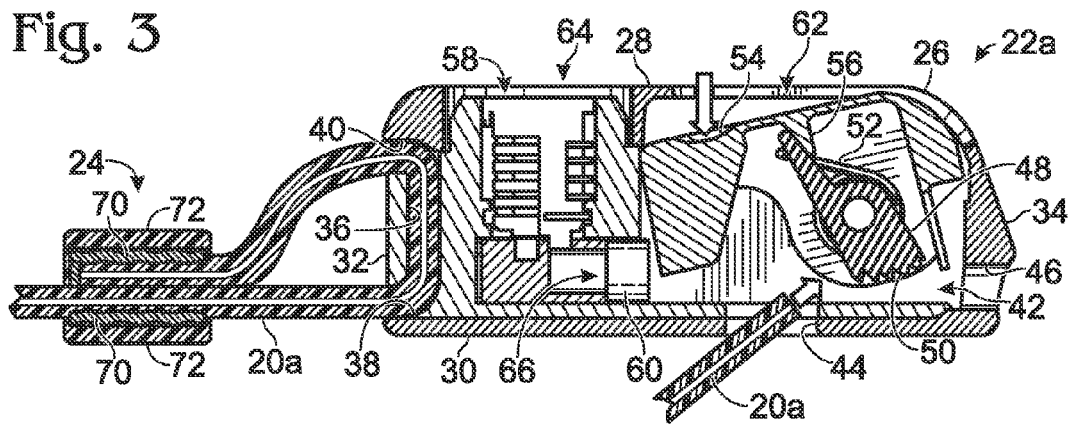
FIGS. 3-6 are a series of cross sectional views of a buckle used to secure a strap for carrying cargo.

For example, as shown in FIG. 3, a first portion of strap 20a may pass through a first passageway 36, and through a first opening 38 and a second opening 40 disposed in first end 32 of buckle 22a. A second portion of strap 20a may pass through a second passageway 42, and through a third opening 44 disposed in bottom wall 30 and a fourth opening 46 disposed in second end 34 of buckle 22a. It will be appreciated that the number and location of the openings on slot 20a can be varied to position strap 20a within or through housing 26 as desired.

A first end of strap 20a may be fixed outside of housing 26. For example, as shown, a first portion of strap 20a may be looped through first opening 38 and second opening 40 of housing 26. The first end of strap 20a may be secured with crimp or clamp 24 back onto another portion of strap 20a. Crimp or clamp 24a may be located outside of housing 26. An inner layer of material 70 may be crimped or secured onto portions of strap 20a, for example to secure together first end of strap 20a with another portion of strap 20a. Material 70 may be aluminum or any other suitable material. A sleeve 72 may be positioned or slid over material 70. Protective sleeve 72 may be made of rubber or any other suitable material. This configuration of material 70 covered by sleeve 72 may prevent the removal of crimp 24 from a secured position on strap 20a. Preventing removal may help prevent theft because strap 20a will be in a secured position using crimp 24a to prevent the removal or disengagement of strap 20a from housing 26.

Housing 26 may include a cam or pawl 48, a button (or switch or toggle) 54, a lock 58, and a follower (or sliding member or blocking member or sliding block or pillar) 60. Pawl 48 may include a frictional surface. The frictional surface may include teeth 50 for gripping strap 20a. Teeth 50 may each have a pointed tip that grips to strap 20a.

Figure 5:
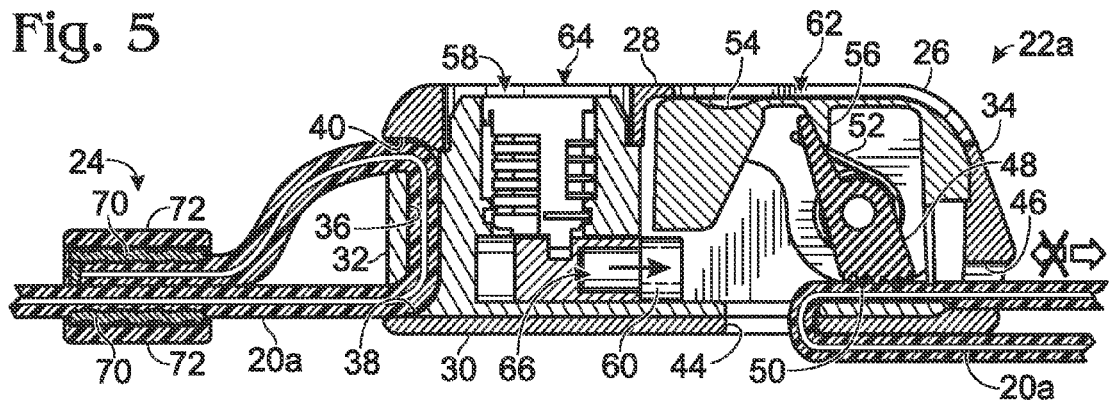

Cam or pawl 48 may be pivotally mounted within housing 26. Cam or pawl 48 may be biased in a first direction (here, a clockwise direction) by a biasing mechanism 52, such as a spring. Biasing mechanism 52 may bias cam or pawl 48 to a first position in which teeth 50 press against a portion of strap 20a, preventing withdrawal of the strap in one direction but allowing the strap to be fed in a second direction. An embodiment is shown in FIG. 5 where strap 20a can move from opening 44 towards opening 46 and cannot move from opening 46 towards opening 44 when cam or pawl 48 is engaged to strap 20a.

Button 54 may be proximate cam 48 and be movable between first and second positions. For example, in an embodiment, the first position of button 54 may be the one shown in FIGS. 4 and 5 and the second position of button 54 may be the one shown in FIGS. 3 and 6.

A protrusion 56 proximate button 54 may engage pawl 48, and urge pawl 48 when engaged to rotate in a reverse direction (here, a counterclockwise direction) as button 54 is pressed downward, as shown in FIG. 3.

Lock 58 may be operated between unlocked and locked positions by using an appropriate key, combination, or any other method or device which allows a user to control access to the buckle mechanism. In an embodiment, lock 58 may be mounted in a portion of housing 26 away from cam or pawl 48 and button 54. Lock 58 may have a key slot 59 (shown in FIG. 2) and can be operated with a key to unlock buckle 22a.

Figure 4:
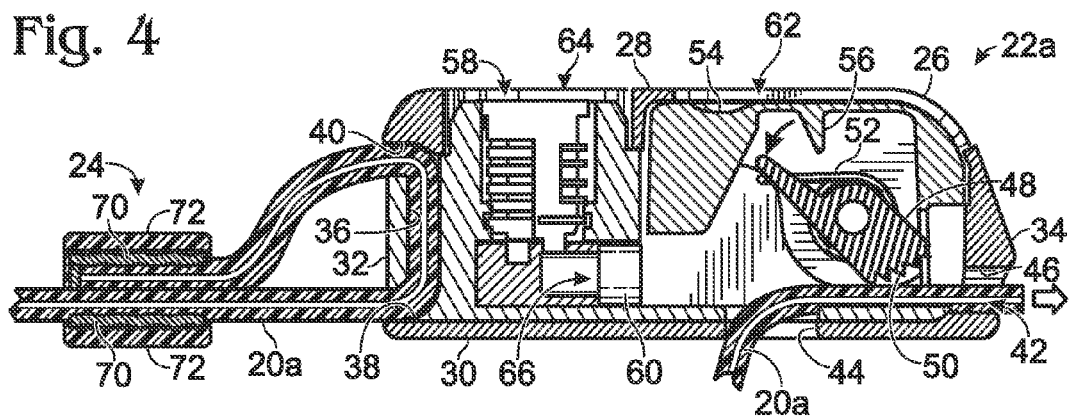
Figure 6:
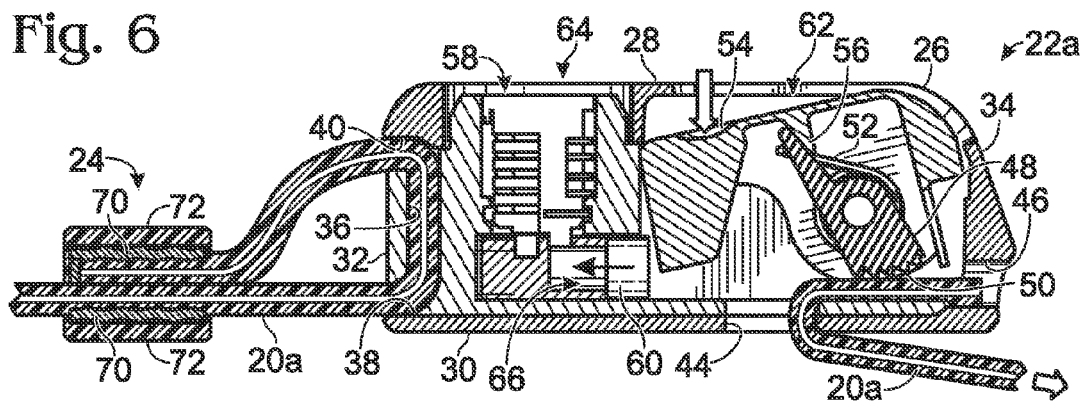

Follower 60 may be linked or coupled to lock 58 in such a manner so that movement of lock 58 to the unlocked position causes follower 60 to move substantially away or out of the path of button 54, as follower 60 moves into an unblocking position (e.g., an unblocking position is shown in FIGS. 3, 4 and 6).

As shown, unlocking lock 58 may cause follower 60 to be moved completely out of the way or path of the bottom of button 54 when follower 60 is in the unblocking position. Button 54 then can be pressed downwards, which in turn moves an end of cam or pawl 48 opposite teeth 50 downward. This movement of the end of cam or pawl 48 in turn causes cam or pawl 48 to pivot against the bias of biasing mechanism 52, causing teeth 50 to be disengaged from strap 20a. The second portion or end of strap 20a may then be moved to allow strap 20a to be tightened or loosened, such as around cargo 12. For example, FIG. 6 shows an embodiment where lock 58 is in the unlocked position, follower 60 is in the unblocking position, and strap 20a can be moved from opening 44 toward opening 46, or vice versa, when button 54 is depressed against the end of cam or pawl 48.

In an embodiment, locking lock 58 may cause follower 60 to be moved into a blocking position into the path of button 54 to prevent button 54 from being depressed into the second position. An example of the blocking position is shown in FIG. 5. Follower 60 may move into a position to physically block button 54 from being moved to the second position. The second end portion of strap 20a may still be tightened when lock 58 is in the locked position and follower 60 is in the blocking position.

In an embodiment, a keyed lock core of lock 58 interacts with follower 60. There may be a small eccentric boss on the bottom of the lock core that engages a slot in the sliding block. Alternatively, a cam and follower mechanism may also be used similarly. Follower 60 may also be biased, for example, by a spring, in one direction or another, or may be passive. Follower 60 may be eccentrically connected to lock 58.

In an embodiment, housing 26 may have a first chamber 62 adjacent a second chamber 64. Chamber 62 may include pawl 48 and button 54. Chamber 64 may include lock 58. Follower 60 may be disposed in a third passageway 66 connecting chambers 62, 64. Third passageway 60 may be oriented adjacent bottom wall 30. Follower 60 may be coupled to lock 58 in such a manner so that movement of lock 58 to the unlocked position causes follower 60 to move in third passageway 66 substantially away or out of chamber 62, and the path of button 54, as it moves into an unblocking position. Another chamber 68 may be provided in which first passageway 36 is located.

FIGS. 3 through 6 show a sequence of the device in various positions. FIG. 3 shows an end portion of strap 20a being threaded through passage 42 of buckle 22a. In an embodiment, it is unnecessary to depress button 54 to insert strap 20a through passage 42 because pawl 48 pushes out of the way when strap 20a is inserted. Because pawl 48 and button 54 are unconnected, when the device is locked, strap 20a can still be tightened. It may be helpful for threading purposes to press button 54, thereby rotating pawl 48 counterclockwise slightly to begin the threading process.

FIG. 4 shows strap 20a being pulled through passage 42 in the process of tightening the strap around cargo and a supporting rack assembly. Friction between strap 20a and teeth 50 of pawl 48 causes pawl 48 to rotate slightly counterclockwise, thereby permitting further tightening of strap 20a.

FIG. 5 shows buckle 22a in a tightened, secure position with respect to strap 20a, with lock 58 in the locked position and follower 60 in the blocking position. Strap 20a is prevented from sliding through passage 36 in a loosening direction by teeth 50 of pawl 48. The orientation of pawl 48 may allow further tightening but does not allow the effective length (length of the strap from one end of the buckle to the other end of the buckle) of the strap to be lengthened or loosened. When lock 58 is in the locked position, follower 60 has moved into the path of button 54 to block button 54 from moving to the second position engaged with the end of pawl 48. Accordingly, the configuration shown in FIG. 5 allows strap 20a to be tightened, but not loosened, thereby preventing an unauthorized person, i.e., a person without a key to the lock, from loosening or removing the strap. For example, in the embodiment of FIG. 5, the second end or portion of strap 20a can be moved from opening 44 toward opening 46, but not from opening 46 toward opening 44, when lock 58 is in the locked position and follower 60 is in the blocking position.

Pawl 48 not being connected to button 54 may allow for pawl 48 to be disengaged from button 54 when lock 58 is in the locked position and follower 60 is in the blocking position. This may allow for moving of strap 20a from third opening 44 to fourth opening 46 when lock 48 is in the locked position and follower 60 is in the blocking position.

A portion of a length of strap 20a may be substantially parallel to top wall 38 and bottom wall 40 of housing 26 when lock 48 is in the locked position.

FIG. 6 shows buckle 22a with lock 58 in the unlocked position and follower 60 in the unblocking position. Accordingly, follower 60 is retracted in passageway 66 substantially out of chamber 62, out of the path of button 54, thereby permitting button 54 to be pressed to the second position (examples of second positions are shown in FIGS. 3 and 6) for strap loosening purposes. When lock 58 has been rotated to the unlocked position, lock 58 causes follower 60 to retract out of the path of button 54 and out of chamber 64, thus permitting movement of button 54 into the second position and allowing loosening and/or removal of strap 20a from a cargo carrying load and/or rack.

A strap may be suitably constructed of materials for the purpose of resisting cutting. For example, the strap may be comprised of one or more continuous cut-resistant strands. The strap may be constructed of one or more materials for the purpose of resisting cutting and/or flexibility, such as a textile, nylon, polypropylene or polyester material reinforced with a second material to add greater tensile strength. The textile material and/or the reinforcing material may prevent cutting of the material of the strap by a knife or other cutting implement to improve theft resistance. The cut resistance of the strap may be cut resistant to the use of knives, scissors, sheet metal shears or other common hand tools.

The strap may have a substantially flat cross-section. Alternatively, the strap may include one or more segments of chain, wire, cable, cord, or any other type of cut-resistant substantially flexible material. The strap may have mainly a circular, or other non-flat, cross-section.

For example, nylon, polypropylene or polyester webbing with inserted wired rope (e.g., single rope and/or multiple ropes, and/or braided-wire ropes, etc.) may be used for the strap. Alternatively, nylon, polypropylene or polyester webbing with inserted flat woven steel webbing, or coated wire ropes may also be used. Over-molded steel cords or belts, like steel-corded tire or timing belts (e.g., single cord and/or multiple cords, etc.) may also be used.

Figure 7:
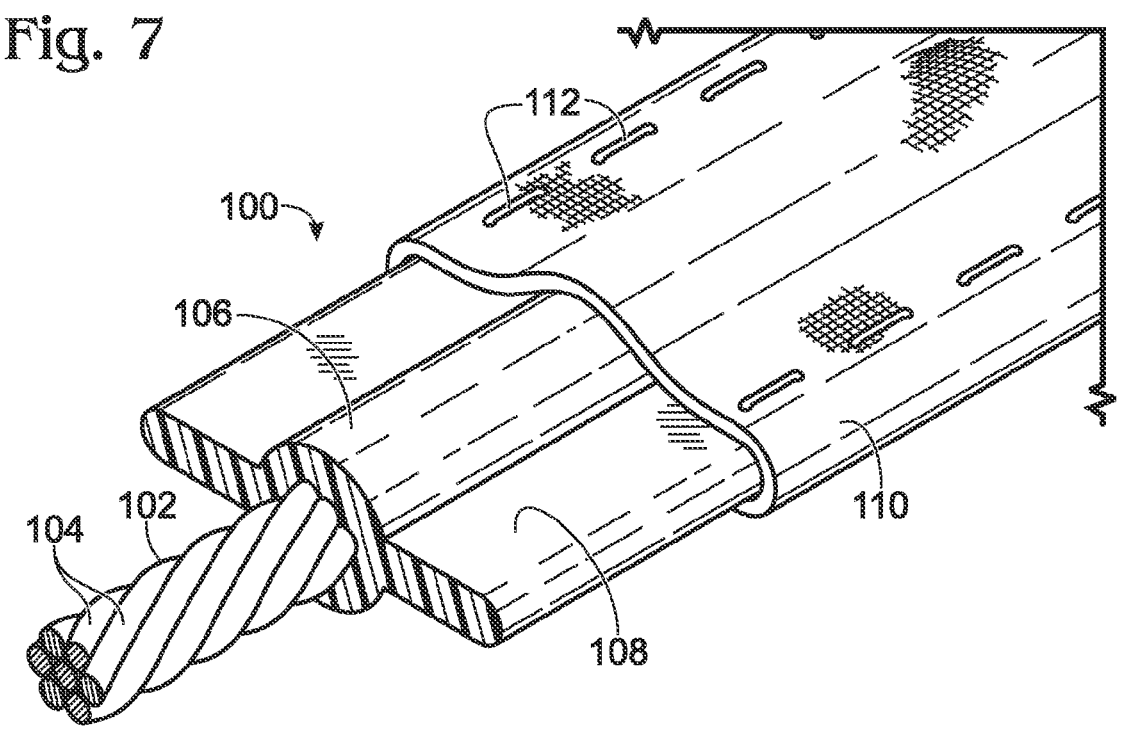
FIG. 7 is a partial cut-away perspective view of an embodiment of a cut-resistant strap configuration.

As shown in FIG. 7, shows an embodiment strap 100 of strap 20a includes steel cable 102. Cable 102 may include multiple steel fibers 104 woven or wound together in a rope configuration. Sleeve 106, for example, made of nylon, may be extruded over cable 102. Sleeve 106 may have wings (or flanks) 108. Sleeve 106 may be contained in webbing 110 which may be made from woven nylon or polypropylene. Stitching 112 may then be used to attach webbing 110 to wings 108 of sleeve 106. Use of an extruded sleeve and stitching to connect one or more steel cables to a piece of webbing prevents sliding of the rope or cable inside the webbing, which otherwise may be exploited to defeat the security device. Any suitable method of attaching webbing 110 to sleeve 106 may be utilized.

In an embodiment, cut-resistant security strap 100 may include an inner layer including a cable 102 formed by a plurality of interwoven fibers 104, a second layer 106 covering the first layer that includes a chamber in which the cable is housed and a pair of flanks 108 disposed on each side of the chamber, and an outer later 110 covering the second and inner layers that is stitched 112 to the wings of the second layer. The fibers may be comprised of steel, the second layer may be comprised of nylon, and the outer layer may be comprised of woven nylon or polypropylene.

Figure 8:
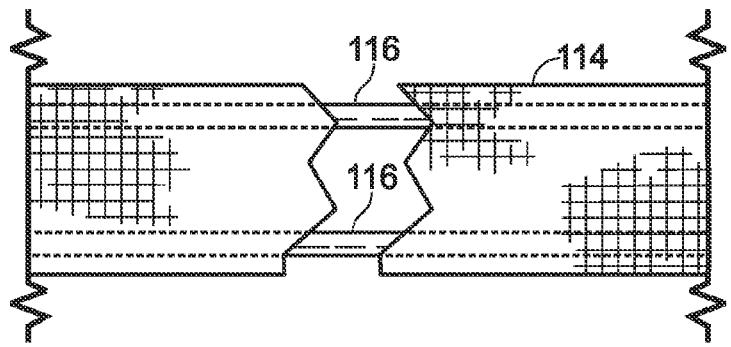
FIG. 8 is a partial view showing an embodiment of a cut-resistant strap configuration.
Figure 9:
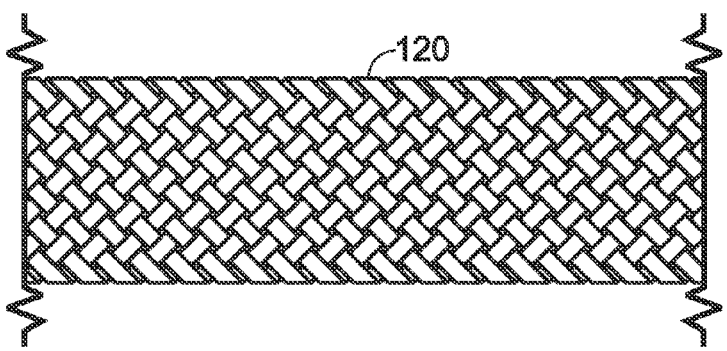
FIG. 9 is a partial view showing an embodiment of a cut-resistant strap configuration.
Figure 10:
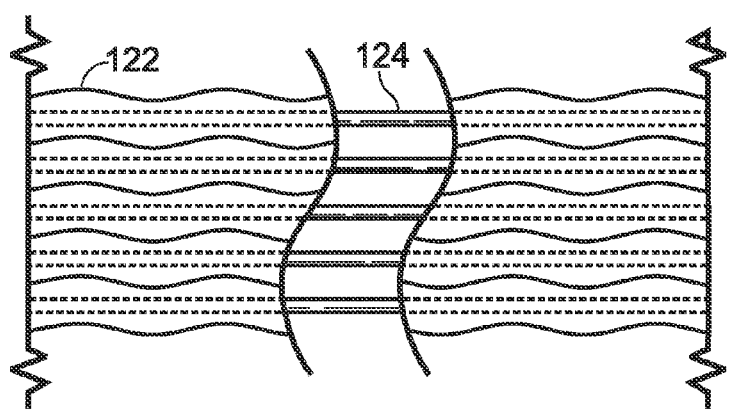
FIG. 10 is a partial view showing an embodiment of a cut-resistant strap configuration.
Figure 11:
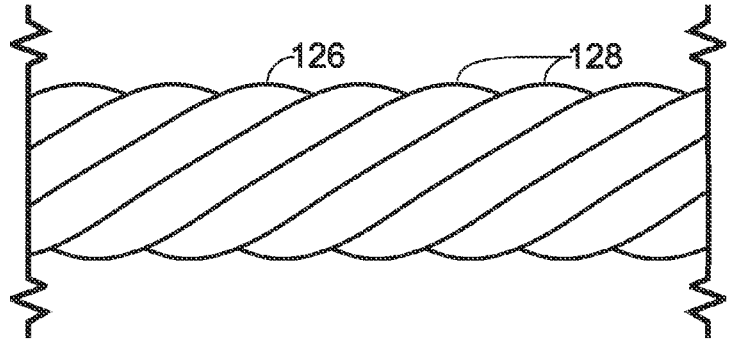
FIG. 11 is a partial view showing an embodiment of a cut-resistant strap configuration.

FIGS. 8-11 show other embodiments of cut-resistant materials that may be included in strap 20a in accordance with the present disclosure. As shown in FIG. 8, strap 20a may include a textile, nylon, polypropylene or polyester material 114 and a plurality of metal strands 116 running through material 114. Additionally and/or alternatively, strap 20a may include braided wire ropes 120 (FIG. 9). Additionally and/or alternatively, strap 20a may include a braided textile, nylon, polypropylene or polyester material 122 for additional cut resistance and may further include a plurality of metal strands 124 (FIG. 10). Additionally and/or alternatively, strap 20a may include a metal cable 126 having multiple twisted metal cords 128. (FIG. 11).

Further embodiments of the present disclosure are described in the following set of indexed paragraphs.

1. A binding device for securing cargo on a rack comprising:

a strap having a cable running between first and second end portions, a cable covering layer that includes a chamber in which the cable is housed and a pair of flanks disposed on each side of the chamber, and an outer later covering the cable covering layer and cable that is attached to the flanks of the second layer, a buckle including a housing with a first opening through which the first portion of the strap extends and a second opening through which the second portion of the strap extends, a cam in the housing configured to engage the strap and being biased against the strap in an orientation that allows movement of the strap in a tightening direction but not in a loosening direction, a control button being biased in a first position and movable through a path to a second position, wherein moving the control button to the second position causes the cam to disengage the strap, allowing the strap to be moved in the loosening direction, a lock connected to the housing, the lock being operable between locked and unlocked positions, and a follower coupled to the lock, the follower being movable into the path of the follower to block movement of the control button when the lock is in the locked position, wherein the strap is movable in the tightening direction but not in the loosening direction when the follower is blocking movement of the control button and the lock is in the locked position.

2. The binding device of as previously described, wherein the follower is completely out of the path of the control button when the lock is in the unlocked position and movable into the path to block movement of the control button when the lock is in the locked position.

3. The binding device of as previously described, wherein the cam engages a protrusion proximate the control button when the control button is moved between the first and second positions.

4. The binding device of as previously described, wherein the follower is disposed directly beneath the control button when the lock is in the locked position.

5. The binding device of as previously described, wherein the housing includes a first end, a second end, a top wall, and a bottom wall, the first end having a first opening and a second opening, the bottom wall having a third opening, and the second end having a fourth opening, a first end portion of the strap extending through the first and second openings, and a second end portion of the strap extending through the third and fourth openings.

6. The binding device of as previously described, wherein the lock has a key slot accessible through the top wall of the housing and a cylinder disposed within a first chamber of the housing separate from a second chamber of the housing in which the control button and cam are disposed, the first and second chambers being connected by a passage disposed adjacent the bottom wall.

7. The binding device of as previously described, wherein the follower is connected to the cylinder of the lock and is operable to move in the passage in and out of the path of the control button.

8. The binding device of as previously described, wherein the strap is moved in the tightening direction when the second end portion of the strap is being moved in the direction from the third opening toward the fourth opening and is moved in the loosening direction when the second end portion of the strap is being moved in the direction from the fourth opening toward the third opening.

The various structural members disclosed herein may be constructed from any suitable material, or combination of materials, such as metal, plastic, nylon, rubber, or any other materials with sufficient structural strength to withstand the loads incurred during use. Materials may be selected based on their durability, flexibility, weight, and/or aesthetic qualities.

This disclosure provides numerous selected examples of invented devices for carrying cargo, including on or with a vehicle. Many alternatives and modifications which may or may not be expressly mentioned are enabled, implied, currently possessed, and supported by the disclosure. It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

I claim:

1. A binding device for securing cargo on a rack comprising:
   a strap having a cable running between first and second end portions, a cable covering layer that includes a chamber in which the cable is housed and a pair of flanks disposed on each side of the chamber, and an outer layer covering the cable covering layer and the cable and being attached to the flanks of the cable covering layer,
   a housing having a plurality of openings through which the first and second end portions extend,
   a spring biased cam in the housing, having a frictional surface configured to engage a portion of the strap located in the housing, the cam being biased against the strap in an orientation that allows movement of the second end portion of the strap in a tightening direction but not in a loosening direction when the cam is biased against the strap,
   a control button being biased in a first position and pressable through a path to a second position, wherein pressing of the control button to the second position causes the cam to disengage the strap, allowing the second end portion to be moved in the loosening direction, and
   a lock connected to the housing, the lock being operable between locked and unlocked positions, wherein the second end portion of the strap is not movable in the loosening direction when the lock is in the locked position.

2. The binding device of claim 1, further comprising a follower positioned in the housing completely out of the path of the control button when the lock is in the unlocked position, wherein the follower moves into the path of the control button when the lock is moved into the locked position.

3. The binding device of claim 2, wherein the follower is disposed directly beneath the control button when the follower is in a the blocking position and the lock is in the locked position.

4. The binding device of claim 1, wherein the plurality of openings includes a first opening, a second opening, a third opening, and a fourth opening, and the housing includes a top wall, a first end having the first and second openings, a bottom wall having the third opening, and a second end having the fourth opening, the first end portion of the strap extending through the first and second openings, and the second end portion of the strap extending through the third and fourth openings.

5. The binding device of claim 4, wherein the strap is movable from the third opening toward the fourth opening when the follower is in the blocking position.

6. The binding device of claim 4, further comprising a follower disposed in a passage adjacent the bottom wall, the follower being movable in the passage when the lock is in the locked position into a blocking position located in the path of the control button physically to block the control button from moving to the second position.

7. The binding device of claim 1, wherein the first end portion of the strap is fixed onto another portion of the strap outside the housing.

8. The binding device of claim 1, wherein the cable includes a plurality of interwoven metal fibers and the webbing is stitched to the flanks.

9. The binding device of claim 8, wherein the fibers are comprised of steel, the cable covering layer is comprised of nylon, and the outer layer is comprised of woven nylon or polypropylene, the outer layer being sewn to the flanks of the covering layer.

10. The binding device of claim 1, wherein the cable covering layer is extruded around the cable.

11. The binding device of claim 1, wherein the cable is prevented from sliding longitudinally relative to the covering layer, and the covering layer is prevented from sliding longitudinally relative to the outer layer.

12. The binding device of claim 1, wherein the first end portion of the strap is secured outside the housing using a crimp.

* * * * *